Sept. 11, 1934.    E. GOLDBERG    1,973,203

NIPKOW DISK FOR TELEVISION

Filed Sept. 15, 1932

INVENTOR
Emanuel Goldberg
BY
ATTORNEY

Patented Sept. 11, 1934

1,973,203

UNITED STATES PATENT OFFICE 1,973,203

NIPKOW DISK FOR TELEVISION

Emanuel Goldberg, Dresden-Loschwitz, Germany, assignor to Zeiss Ikon, Aktiengesellschaft Dresden, Dresden, Germany Application September 15, 1932, Serial No. 633,249

1 Claim. (Cl. 178—6)

This invention relates to improvements in the so-called Nipkow disks or plates used for television purposes, and it is the principal object of my invention to produce such a plate or disk from a moldable material permitting stamping or pressing into which the lenses are pressed, thus avoiding the provision or the necessity of providing a special frame for the lenses.

Another object of my invention is the provision of a Nipkow disk or plate by pressing the entire plate and lenses from glass thus presenting an undivided whole.

These and other objects of my invention will become more fully known as the description thereof proceeds and will then be more specifically defined in the appended claim.

In the art of television the pictures or objects to be transmitted are scanned or analyzed and divided into single picture lines by the Nipkow plates.

These disks or plates have either small openings or lenses according to the selected type of transmission, and said openings or lenses are either arranged in a circle concentrical to the axis of rotation of the disk or in a spiral.

The invention relates to a new method of making such Nipkow disks or plates, which at present are made from a metal disk on which the lenses are arranged each per se, in a special lining or frame.

The practice has proven that such constructions are tedious and expensive to make, while I avoid these disadvantages by my construction.

I am able according to my method to make the disks or plates entirely of glass leaving the surface thereof rough avoiding polishing or grinding or just polishing and grinding one side of the disk only.

In the accompanying drawing forming a material part of this disclosure:

Figure 1:
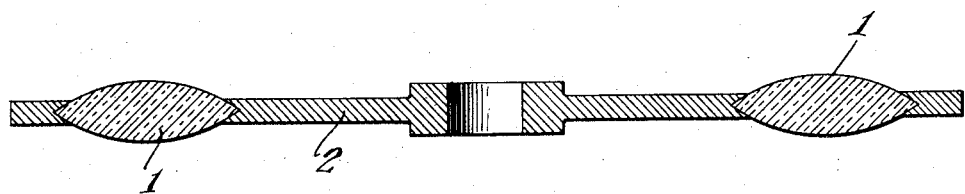
Fig. 1 shows a disk or plate in section made according to my method in which the lenses are pressed into a moldable material.

As illustrated in Figure 1, the glass lenses 1 are pressed into a moldable material 2.

Figure 2:
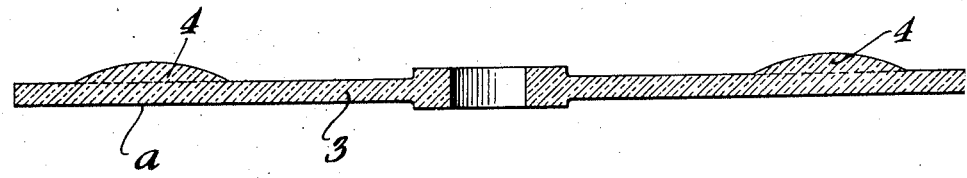
Fig. 2 illustrates a disk or plate made entirely of glass with the lenses therein.

In Figure 2 the disk or plate 3 and the lenses 4 are made from a single piece of glass into which the lenses are pressed. The face $a$ of the disk or plate is preferably ground or polished.

It will be understood that I have shown and described the preferred forms of my invention as some examples only of the many possible ways to practically make the same, and that I may make such changes in the general arrangement thereof and in the construction of the minor details as come within the scope of the appended claims without departure from the spirit of my invention and the principles involved.

Having thus described my invention, what I claim as new and desire to secure by Letters Patent is:

A method of making Nipkow disks or plates for television purposes consisting in molding a body of artificial resin, properly working and grinding the lenses, and pressing the lenses directly into said body during the molding thereof.

EMANUEL GOLDBERG.